US009270650B2

(12) United States Patent
Johnsen et al.

(10) Patent No.: US 9,270,650 B2
(45) Date of Patent: Feb. 23, 2016

(54) SYSTEM AND METHOD FOR PROVIDING SECURE SUBNET MANAGEMENT AGENT (SMA) IN AN INFINIBAND (IB) NETWORK

(75) Inventors: Bjørn-Dag Johnsen, Oslo (NO); Ola Tørudbakken, Oslo (NO); David Brean, Boston, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 551 days.

(21) Appl. No.: 13/487,973

(22) Filed: Jun. 4, 2012

(65) Prior Publication Data

US 2012/0311332 A1    Dec. 6, 2012

Related U.S. Application Data

(60) Provisional application No. 61/493,330, filed on Jun. 3, 2011.

(51) Int. Cl.
*H04L 9/32* (2006.01)
*H04L 29/06* (2006.01)
*H04L 12/24* (2006.01)
*H04L 12/931* (2013.01)

(52) U.S. Cl.
CPC .......... *H04L 63/0442* (2013.01); *H04L 9/3234* (2013.01); *H04L 9/3271* (2013.01); *H04L 41/12* (2013.01); *H04L 49/20* (2013.01); *H04L 63/083* (2013.01); *H04L 63/0876* (2013.01)

(58) Field of Classification Search
CPC .................................................. H04L 63/0876
USPC ........................................................ 713/168
See application file for complete search history.

(56) References Cited

U.S. PATENT DOCUMENTS

| 5,805,805 | A  | 9/1998  | Civanlar et al. |
| 5,964,837 | A  | 10/1999 | Chao et al. |
| 6,463,470 | B1 | 10/2002 | Mohaban et al. |
| 6,594,759 | B1 | 7/2003  | Wang |

(Continued)

FOREIGN PATENT DOCUMENTS

| CN | 1567827 | 1/2005 |
| CN | 1728664 | 2/2006 |

(Continued)

OTHER PUBLICATIONS

Shanley, Tom, "Infiniband Network Architecture" (excerpt), Pearson Education, Copyright © 2002 by MindShare, Inc., published Oct. 2002, p. 204-209, 560-564.

(Continued)

*Primary Examiner* — Monjour Rahim
(74) *Attorney, Agent, or Firm* — Tucker Ellis LLP

(57) ABSTRACT

A system and method can provide a secure subnet management agent (SMA) in an Infiniband (IB) network. The system can comprise a host channel adapter (HCA) associated with a host, wherein the HCA operates to implement a SMA in its embedded firmware. The HCA can prevent a host administrator or software with root access to the host from changing the embedded firmware on the HCA and modifying one or more states associated with the SMA without being endorsed by a site administrator. Additionally, the SMA is associated with a management key, and the host is not allowed to observe the management key without being endorsed by a site administrator.

13 Claims, 7 Drawing Sheets

(56) References Cited

U.S. PATENT DOCUMENTS

| | | |
|---|---|---|
| 6,647,419 B1 | 11/2003 | Mogul |
| 6,678,835 B1 | 1/2004 | Shah et al. |
| 6,748,429 B1 | 6/2004 | Talluri et al. |
| 6,829,685 B2 | 12/2004 | Neal et al. |
| 6,904,545 B1 | 6/2005 | Erimli et al. |
| 6,941,350 B1 | 9/2005 | Frazier et al. |
| 6,963,932 B2 | 11/2005 | Bhat |
| 6,978,300 B1 | 12/2005 | Beukema et al. |
| 6,981,025 B1 | 12/2005 | Frazier et al. |
| 6,985,956 B2 | 1/2006 | Luke et al. |
| 7,023,811 B2 | 4/2006 | Pinto |
| 7,069,468 B1 | 6/2006 | Olson |
| 7,113,995 B1 | 9/2006 | Beukema et al. |
| 7,185,025 B2 | 2/2007 | Rosenstock et al. |
| 7,194,540 B2 | 3/2007 | Aggarwal et al. |
| 7,200,704 B2 | 4/2007 | Njoku et al. |
| 7,216,163 B2 | 5/2007 | Sinn |
| 7,221,676 B2 | 5/2007 | Green |
| 7,231,518 B1 | 6/2007 | Bakke |
| 7,290,277 B1 | 10/2007 | Chou et al. |
| 7,302,484 B1 | 11/2007 | Stapp et al. |
| 7,318,151 B1 | 1/2008 | Harris |
| 7,356,841 B2 | 4/2008 | Wilson et al. |
| 7,398,394 B1 | 7/2008 | Johnsen et al. |
| 7,409,432 B1 | 8/2008 | Recio et al. |
| 7,437,447 B2 | 10/2008 | Brey et al. |
| 7,493,409 B2 | 2/2009 | Craddock et al. |
| 7,500,236 B2 | 3/2009 | Janzen |
| 7,633,955 B1 | 12/2009 | Saraiya et al. |
| 7,634,608 B2 | 12/2009 | Droux et al. |
| 7,685,385 B1 | 3/2010 | Choudhary et al. |
| 7,724,748 B2 | 5/2010 | Davis |
| 7,783,788 B1 | 8/2010 | Quinn et al. |
| 7,843,822 B1 | 11/2010 | Paul et al. |
| 7,860,961 B1 | 12/2010 | Finkelstein et al. |
| 7,873,711 B2 | 1/2011 | Adams et al. |
| 7,975,147 B1 | 7/2011 | Qumei |
| 8,184,555 B1 | 5/2012 | Mouton et al. |
| 8,234,407 B2 | 7/2012 | Sugumar |
| 8,291,148 B1 | 10/2012 | Shah et al. |
| 8,327,437 B2 | 12/2012 | McAlister |
| 8,331,381 B2 | 12/2012 | Brown et al. |
| 8,335,915 B2 | 12/2012 | Plotkin et al. |
| 8,423,780 B2 | 4/2013 | Plotkin et al. |
| 8,549,281 B2 | 10/2013 | Samovskiy et al. |
| 8,583,921 B1 | 11/2013 | Shu |
| 8,924,952 B1 | 12/2014 | Hou |
| 8,972,966 B2 | 3/2015 | Kelso |
| 2002/0059597 A1 | 5/2002 | Kikinis et al. |
| 2002/0120720 A1 | 8/2002 | Moir |
| 2002/0188711 A1 | 12/2002 | Meyer et al. |
| 2003/0009487 A1 | 1/2003 | Prabakaran et al. |
| 2003/0009551 A1 | 1/2003 | Benfield et al. |
| 2003/0065775 A1* | 4/2003 | Aggarwal et al. ............. 709/225 |
| 2003/0079040 A1 | 4/2003 | Jain et al. |
| 2003/0093509 A1 | 5/2003 | Li et al. |
| 2003/0105903 A1 | 6/2003 | Garnett et al. |
| 2003/0120852 A1 | 6/2003 | McConnell et al. |
| 2003/0208572 A1 | 11/2003 | Shah et al. |
| 2004/0022245 A1 | 2/2004 | Forbes et al. |
| 2004/0031052 A1 | 2/2004 | Wannamaker |
| 2004/0037279 A1 | 2/2004 | Zelig et al. |
| 2004/0123142 A1 | 6/2004 | Dubal et al. |
| 2004/0153849 A1 | 8/2004 | Tucker et al. |
| 2004/0162973 A1 | 8/2004 | Rothman |
| 2004/0193768 A1 | 9/2004 | Carnevale |
| 2004/0199764 A1 | 10/2004 | Koechling et al. |
| 2004/0220947 A1 | 11/2004 | Aman et al. |
| 2004/0249928 A1 | 12/2004 | Jacobs et al. |
| 2004/0255286 A1 | 12/2004 | Rothman |
| 2005/0044363 A1 | 2/2005 | Zimmer et al. |
| 2005/0071382 A1 | 3/2005 | Rosenstock et al. |
| 2005/0071709 A1 | 3/2005 | Rosenstock et al. |
| 2005/0091396 A1 | 4/2005 | Nilakantan et al. |
| 2005/0105554 A1 | 5/2005 | Kagan et al. |
| 2005/0125520 A1 | 6/2005 | Hanson et al. |
| 2005/0182701 A1 | 8/2005 | Cheston |
| 2005/0182831 A1 | 8/2005 | Uchida et al. |
| 2005/0182853 A1 | 8/2005 | Lewites et al. |
| 2005/0198164 A1 | 9/2005 | Moore et al. |
| 2005/0198250 A1 | 9/2005 | Wang |
| 2005/0213608 A1 | 9/2005 | Modi et al. |
| 2005/0273641 A1 | 12/2005 | Sandven et al. |
| 2006/0079278 A1 | 4/2006 | Ferguson et al. |
| 2006/0136735 A1* | 6/2006 | Plotkin et al. ............. 713/182 |
| 2006/0195560 A1 | 8/2006 | Newport |
| 2006/0221975 A1 | 10/2006 | Lo et al. |
| 2006/0233168 A1 | 10/2006 | Lewites et al. |
| 2007/0016694 A1 | 1/2007 | Achler |
| 2007/0050763 A1 | 3/2007 | Kagan |
| 2007/0110245 A1 | 5/2007 | Sood et al. |
| 2007/0129917 A1 | 6/2007 | Blevins |
| 2007/0195794 A1 | 8/2007 | Fujita et al. |
| 2007/0206735 A1 | 9/2007 | Silver et al. |
| 2007/0253328 A1 | 11/2007 | Harper et al. |
| 2008/0031266 A1 | 2/2008 | Tallet et al. |
| 2008/0144614 A1 | 6/2008 | Fisher et al. |
| 2008/0159277 A1 | 7/2008 | Vobbilisetty |
| 2008/0183853 A1 | 7/2008 | Manion et al. |
| 2008/0192750 A1* | 8/2008 | Ko et al. ............. 370/395.3 |
| 2008/0201486 A1 | 8/2008 | Hsu et al. |
| 2008/0209018 A1 | 8/2008 | Hernandez et al. |
| 2008/0229096 A1 | 9/2008 | Alroy et al. |
| 2008/0250125 A1 | 10/2008 | Brey et al. |
| 2008/0310422 A1 | 12/2008 | Booth et al. |
| 2008/0320117 A1 | 12/2008 | Johnsen et al. |
| 2009/0049164 A1 | 2/2009 | Mizuno |
| 2009/0116404 A1 | 5/2009 | Mahop et al. |
| 2009/0178033 A1 | 7/2009 | Challener |
| 2009/0216853 A1 | 8/2009 | Burrow et al. |
| 2009/0307499 A1 | 12/2009 | Senda |
| 2009/0327462 A1 | 12/2009 | Adams et al. |
| 2010/0020806 A1 | 1/2010 | Vahdat et al. |
| 2010/0080117 A1 | 4/2010 | Coronado et al. |
| 2010/0082853 A1 | 4/2010 | Block et al. |
| 2010/0138532 A1 | 6/2010 | Glaeser et al. |
| 2010/0142544 A1 | 6/2010 | Chapel et al. |
| 2010/0166167 A1 | 7/2010 | Karimi-Cherkandi et al. |
| 2010/0235488 A1 | 9/2010 | Sharma et al. |
| 2010/0268857 A1 | 10/2010 | Bauman et al. |
| 2010/0306772 A1 | 12/2010 | Arnold et al. |
| 2011/0072206 A1 | 3/2011 | Ross et al. |
| 2011/0110366 A1 | 5/2011 | Moore et al. |
| 2011/0138082 A1 | 6/2011 | Khatri |
| 2011/0138185 A1 | 6/2011 | Ju et al. |
| 2011/0173302 A1 | 7/2011 | Rider |
| 2011/0209202 A1 | 8/2011 | Otranen |
| 2011/0222492 A1 | 9/2011 | Borsella et al. |
| 2011/0264577 A1 | 10/2011 | Winbom et al. |
| 2012/0005480 A1 | 1/2012 | Batke et al. |
| 2012/0039331 A1 | 2/2012 | Astigarraga et al. |
| 2012/0084420 A1 | 4/2012 | Ayanam et al. |
| 2012/0151223 A1 | 6/2012 | Conde Marques et al. |
| 2012/0195417 A1 | 8/2012 | Hua et al. |
| 2012/0239928 A1 | 9/2012 | Judell |
| 2012/0290698 A1 | 11/2012 | Alroy et al. |
| 2012/0311332 A1 | 12/2012 | Johnsen et al. |
| 2012/0311682 A1 | 12/2012 | Johnsen et al. |
| 2013/0003976 A1 | 1/2013 | An et al. |
| 2013/0041969 A1 | 2/2013 | Falco et al. |
| 2013/0046904 A1 | 2/2013 | Hilland |
| 2013/0138836 A1 | 5/2013 | Cohen et al. |
| 2013/0159865 A1 | 6/2013 | Smith et al. |
| 2013/0179870 A1 | 7/2013 | Kelso |
| 2013/0191622 A1 | 7/2013 | Sasaki |
| 2014/0095853 A1 | 4/2014 | Sarangshar |
| 2014/0095876 A1 | 4/2014 | Smith et al. |
| 2014/0101653 A1 | 4/2014 | Dharmadhikari et al. |

FOREIGN PATENT DOCUMENTS

| | | |
|---|---|---|
| EP | 1 128 607 A2 | 8/2001 |
| EP | 2 051 436 A1 | 4/2009 |
| EP | 2160068 A1 | 3/2010 |

(56) References Cited

FOREIGN PATENT DOCUMENTS

| | | |
|---|---|---|
| JP | 2002247089 A | 8/2002 |
| JP | 2004166263 | 6/2004 |
| JP | 2006157285 | 6/2006 |
| JP | 2008054214 A | 3/2008 |
| WO | 01/90838 A2 | 11/2001 |
| WO | 03088050 | 10/2003 |
| WO | 2008099479 | 8/2008 |
| WO | 2012037518 | 3/2012 |

OTHER PUBLICATIONS

Tom Shanley, Infiniband Network Architecture (excerpt), chapter—Detailed Description of the Link Layer, Pearson Education, published 2002, p. 390-392, 485, 491-493, 537-539.

Aurelio Bermudez, On the InfiniBand Subnet Discovery Process, IEEE The Computer Society 2003, pp. 1-6.

Tom Shanley, Infiniband Network Architecture, Pearson Education 2002, p. 559, 561.

Tom Shanley, "Infiniband Network Architecture", Copyright © 2002 by MindShare, Inc., ISBN: 0-321-11765-4, pp. 206-208, 403-406.

Tom Shanley, "Infiniband Network Architecture", Copyright © 2002 by MindShare, Inc., ISBN: 0-321-11765-4, pp. 83-87, 95-102, 205-208, 403-406.

V. Kashyap, "IP over InfiniBand (IpoIB) Architecture", Network Working Group RFC 4392, Apr. 2006, 22 pages, retrieved on Apr. 9, 2015 from: <http://www.ietf.org/rfc/rfc4392>.

Shanley, Tom, Infiniband Network Architecture (excerpt), Pearson Education, published 2002, p. 209-211, 393-394, 551, 554.

Shanley, Tom, "Infiniband Network Architecture", Pearson Education, Copyright © 2002 by MindShare, Inc., published Oct. 2002, p. 387-394.

Mellanox Technologies, Inc., "Introduction to InfiniBand™" Rev 1.90, retrieved Jan. 12, 2015 <http://www.mellanox.com/pdf/whitepapers/IB_Intro_WP_190.pdf>, 20 pages.

Zhuo, Haihong et al., "Remote Management with the Baseboard Management Controller in Eighth-Generation Dell PowerEdge Servers", Oct. 2004, retrieved Jan. 12, 2015, <http://www.dell.com/downloads/global/power/ps4q04-20040110-zhuo.pdf>, pp. 26-29.

European Patent Office, International Searching Authority, International Search Report and Written Opinion dated Mar. 25, 2015 for International Application No. PCTUS2014059949, 12 pages.

Mellanox Technologies, "Boot over IB (BoIB) User's Manual Rev 1.0", © copyright 2008, 28 pages, retrieved Apr. 7, 2015 from: <http://www.mellanox.com/pdf/BoIB/Boot-over-IB_User_Manual_1_0.pdf>.

Mellanox Technologies, "InfiniScale® IV 8-Port QSFP 40 Gb/s InfiniBand Switch User Manual Rev 1.4", © copyright 2012, 55 pages, retrieved Apr. 7, 2015 from: <http://www.mellanox.com/related-docs/user_manuals/IS5022_User_Manual.pdf>.

European Patent Office, International Searching Authority, International Search Report and Written Opinion dated Oct. 11, 2012, International Application No. PCT/US2012/046225, 11 pages.

European Patent Office, International Searching Authority, International Search Report and Written Opinion dated Nov. 30, 2012, International Application No. PCT/US2012/046219, 18 pages.

European Patent Office, International Searching Authority, International Search Report and Written Opinion dated Sep. 12, 2012, International Application No. PCT/US2012/040775, 13 pages.

State Intellectual Property Office of the People's Republic of China, Search Report dated Aug. 21, 2015 for Chinese Patent Aplication No. 201280030334.2, 2 pages.

International Search Report dated Sep. 26, 2013 for Application No. PCT/US2013/040656, 10 pages.

State Intellectual Property Office of the People's Republic of China, Search Report dated May 29, 2015 for Chinese Patent Application No. 201180040064.9, 1 page.

State Intellectual Property Office of the People's Republic of China, Search Report dated Jun. 3, 2015 for Chinese Patent Application No. 201180039807.0, 2 pages.

State Intellectual Property Office of the People's Republic of China, Search Report dated Sep. 9, 2015 for Chinese Patent Application No. 201280027279.1, 2 pages.

Tom Shanley, Infiniband Network Architecture (excerpt), Pearson Education, Published 2002, p. 213.

State Intellectual Property Office of the People's Republic of China dated May 5, 2015 for Chinese Patent Application No. 201180039850.7, 2 pages.

Lee, M. et al., "Security Enhancement in Infiniband Architecture," Proceedings of the 19th IEEE International Parallel and Distributed Processing Symposium, Denver, Colorado, Apr. 4-8, 2005, Piscataway, New Jersey, Apr. 4, 2005, 18 pages.

Sun Infiniband Dual Port 4x QDR PCIe ExpressModule and Low Profile Host Channel Adapters M2, Frequently Asked Questions, Sep. 21, 2010, http://www.oracle.com/us/products/servers-storage/networking/infiniband/sun-qdr-ib-hcas-faq-172841.pdf, retrieved on Sep. 11, 2012, 4 pages.

InfiniBand$^{SM}$ Trade Association, InfiniBand™ Architecture Specification, vol. 1, Release 1.2.1, Nov. 2007, pp. 1-1727.

International Search Report dated Sep. 23, 2013 for Application No. PCT/US2013/040639, 10 pages.

* cited by examiner

SYSTEM AND METHOD FOR PROVIDING SECURE SUBNET MANAGEMENT AGENT (SMA) IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, which application is herein incorporated by reference.

CROSS REFERENCE TO RELATED APPLICATIONS

This application is related to the following patent application, which is hereby incorporated by reference in its entirety:

U.S. patent application Ser. No. 13/488,005, entitled "SYSTEM AND METHOD FOR PROVIDING SECURE SUBNET MANAGEMENT AGENT (SMA) BASED FENCING IN AN INFINIBAND (IB) NETWORK", by inventors Bjørn Dag Johnsen, Line Holen and Dag Georg Moxnes, filed Jun. 4, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can provide a secure subnet management agent (SMA) in an Infiniband (IB) network. The system can comprise a host channel adapter (HCA) associated with a host, wherein the HCA operates to implement a SMA in its embedded firmware. The HCA can prevent a host administrator or software with root access to the host from changing the embedded firmware on the HCA and modifying one or more states associated with the SMA without being endorsed by a site administrator. Additionally, the SMA is associated with a management key, and the host is not allowed to observe the management key without being endorsed by a site administrator.

DETAILED DESCRIPTION

Described herein is a system and method that can provide a secure subnet management agent (SMA) in a middleware machine environment.

Figure 1:
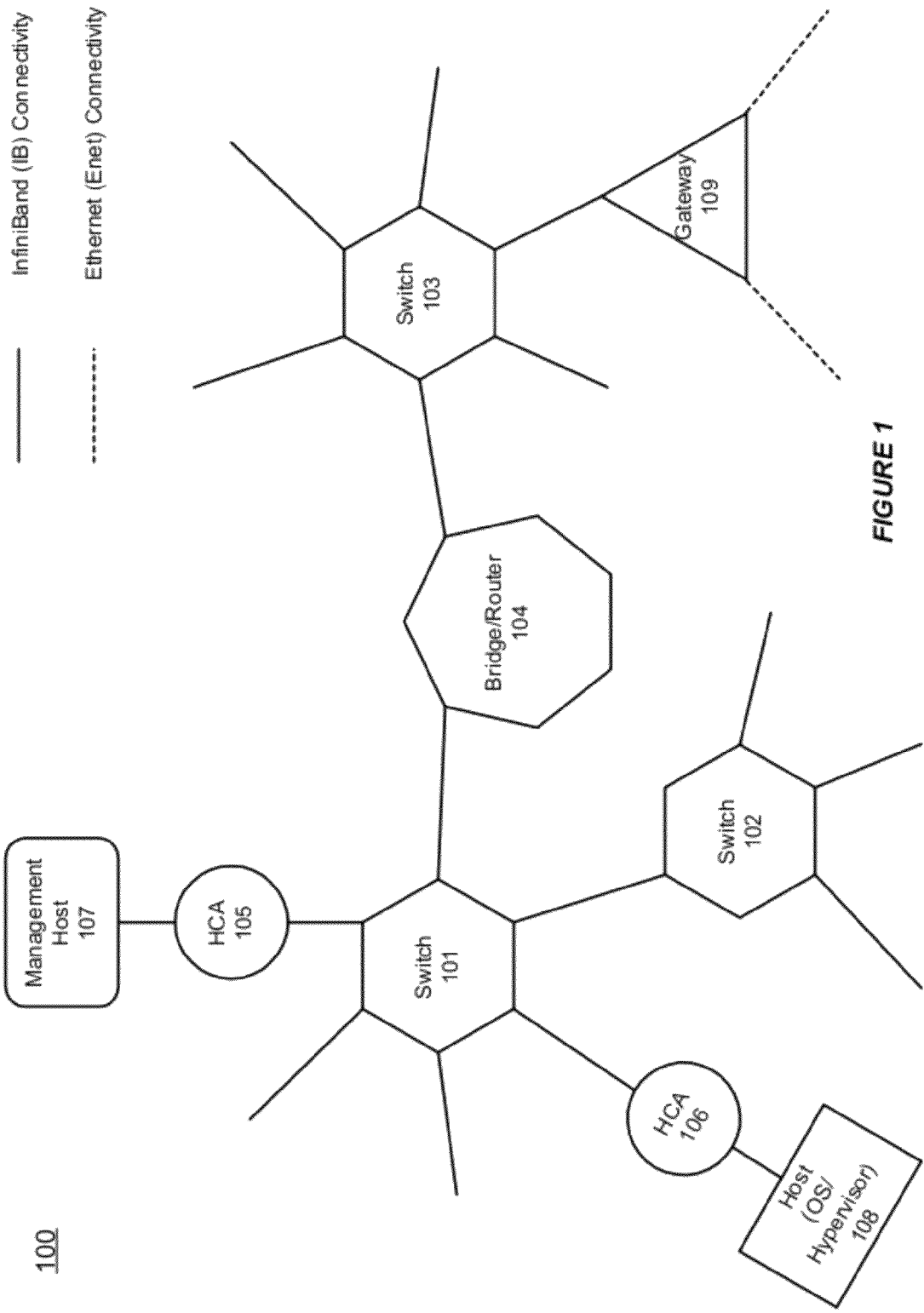
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management 107 hosts can be installed with HCAs 105, 106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can only be indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port Local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and are controlled independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

Secure HCA SMA Implementation

In accordance with an embodiment of the invention, an HCA can implement a SMA, and the run-time and persistent state information associated with the SMA, in a way that is isolated from a host that is connected to the HCA. Additionally, the host administrators, which have root access at the hypervisor or physical OS level, can perform host software and firmware updates and upgrades on the local HCAs as part of standard procedures for maintaining and updating software and firmware on the physical hosts. There can be no need for special procedures for ensuring fabric integrity.

Figure 2:
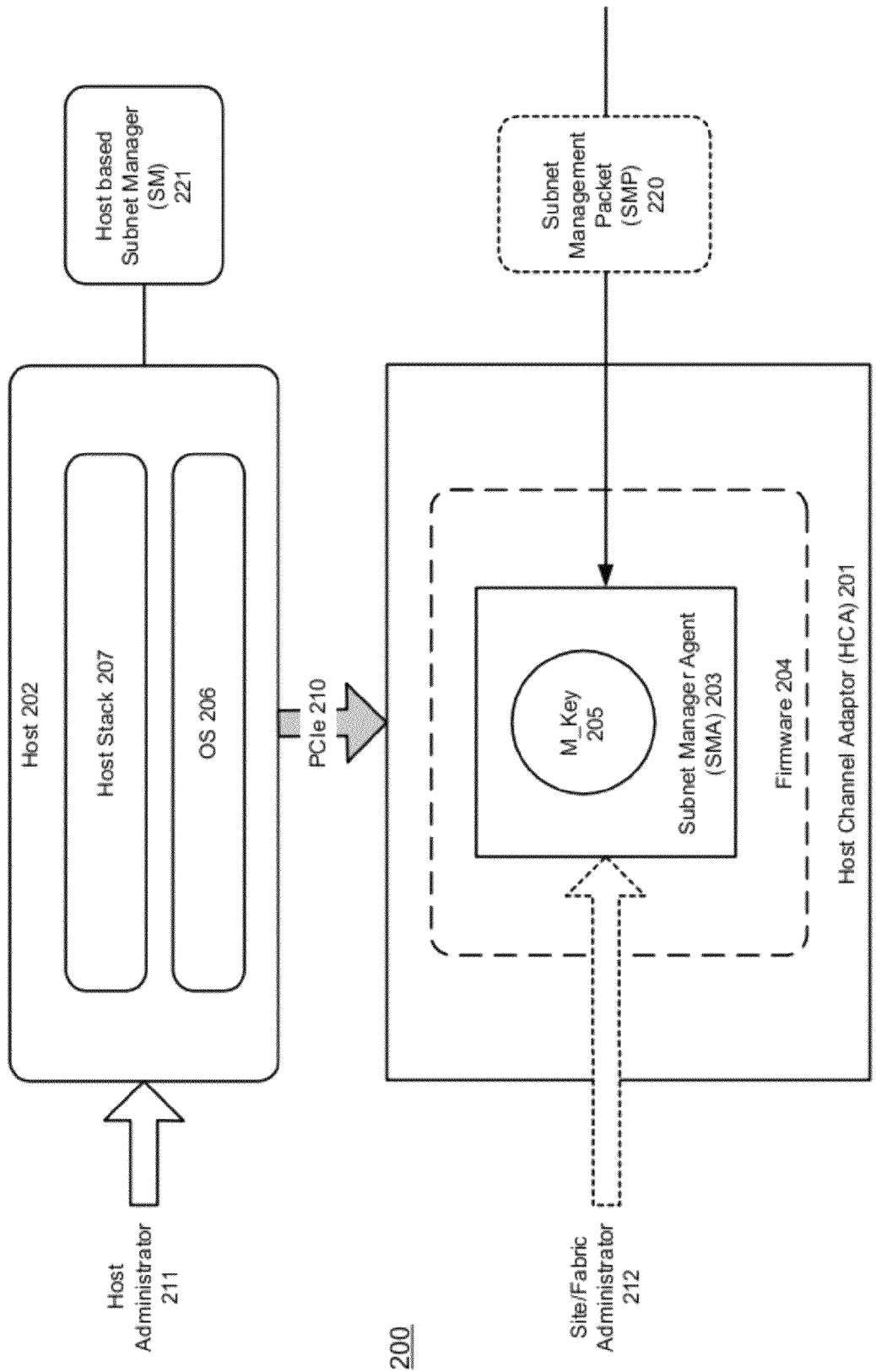
FIG. 2 shows an illustration of a HCA implementation in accordance with an embodiment of the invention.

FIG. 2 shows an illustration of an HCA implementation in accordance with an embodiment of the invention. As shown in FIG. 2, an HCA 201 is associated with a host 202 in a fabric 200. The host 202 can include an operating system (OS) 206 and host stacks 207. The HCA 201 can implement a SMA 203 completely in a HCA embedded firmware 204, and make sure that no access from the host 202, e.g. via a peripheral component interconnect express (PCIe) connection 210, can modify any state or observe a management key, e.g. the currently defined M_Key 205.

Furthermore, in order to allow field upgrade of HCA firmware 204, the system can ensure that the host administrators 211 and/or the software that has root access to the host are not able to change the firmware image 204 without being endorsed by the site administrator 212. This can prevent malicious viruses from potentially changing the firmware image.

This protection scheme can ensure that a host administrator 211 is not able to cause damage to the fabric configuration by starting a host based SM 221 by mistake. Also, this protection scheme can prevent an unauthorized SM from configuring both the switches and the designated SMs to use an M_Key 205 value with minimal protection level, e.g. via a SMP 220.

Figure 3:
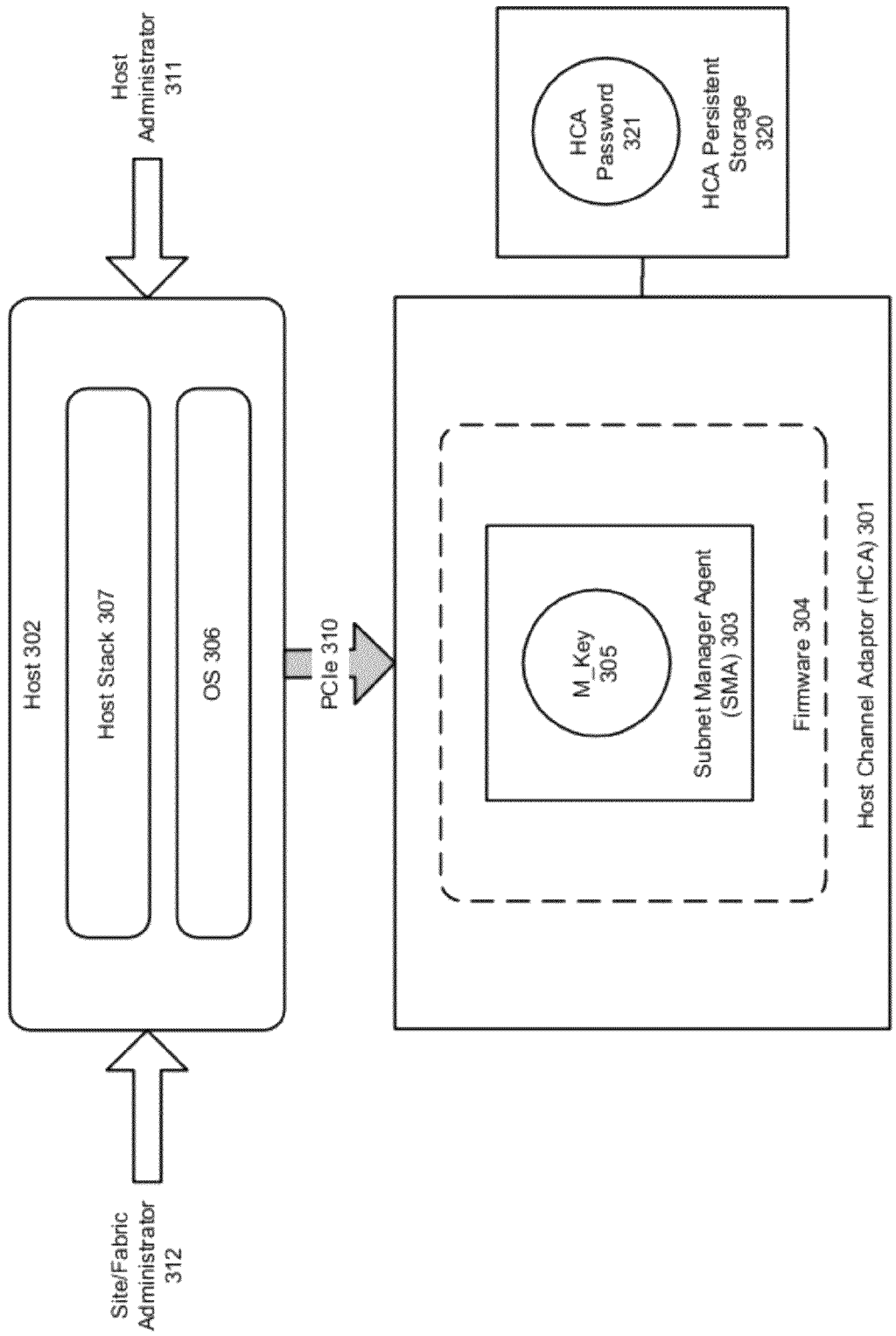
FIG. 3 shows an illustration of supporting a password based HCA firmware upgrade in accordance with an embodiment of the invention.

FIG. 3 shows an illustration of supporting a password-based HCA firmware upgrade in accordance with an embodiment of the invention. As shown in FIG. 3, a site administrator 312, or a fabric administrator, can use a password mechanism to upgrade an embedded firmware 304 on an HCA 301 that is connected to a host 302. This password mechanism allows the actual password 321 to be securely stored and maintained, e.g. in an HCA persistent storage 320. Additionally, this password mechanism can be combined with other mechanisms such as verifying the checksum of the installed firmware image.

This password mechanism can prevent the host 302, and the OS 306 and the host stacks 307 on the host 302, from taking control of the password 321. As shown in FIG. 3, the site administrator 312 can be allowed to have root access to the various physical hosts, e.g. the host 302, and, is, thereby, allowed to perform a password based upgrade on behalf of the host administrator 311 without giving the host administrator 311 an access to the HCA password 321.

Furthermore, the password mechanism can be used together with other mechanisms to address the concern when it is not acceptable or possible to give the site/fabric administrator 312 root accesses to the host 302. Also, this approach can involve complicated procedures because the host administrator 311 may not fully control the maintenance of the local host system 302, and may be prevented from using the existing automated upgrade procedures.

Also, the password mechanism can be used together with other mechanisms to address the security issues associated with this approach, e.g. a communication session with the host 302 for performing the password based HCA firmware upgrade can potentially be subject to spyware or other malicious software that could compromise the HCA password 321, since the host OS 306 and networking stack 307 are controlled by the host administrator 311 and not by the site administrator 312.

Additionally, the SMA 303, M_key 305 and PCIe 310, as shown in FIG. 3, have the same structure and perform the same function as the SMA 203, M_key 205 and PCIe 210, as shown in FIG. 2.

Figure 4:
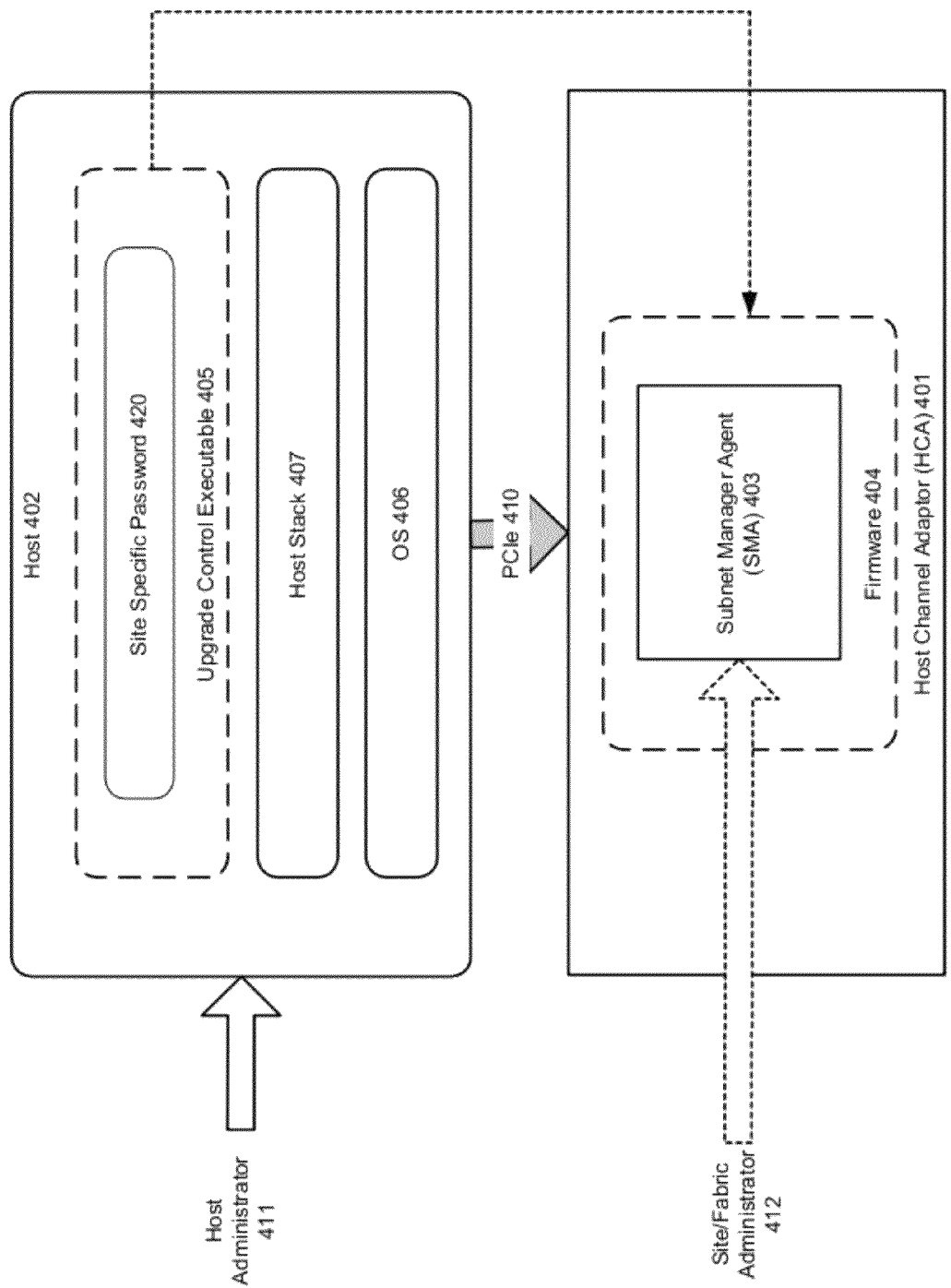
FIG. 4 shows an illustration of supporting an upgrade control executable in accordance with an embodiment of the invention.

FIG. 4 shows an illustration of supporting an upgrade control executable in accordance with an embodiment of the invention. As shown in FIG. 4, an upgrade control executable 405 can be used to upgrade an embedded firmware 404 for an HCA 401 that is connected to a host 402. This upgrade control executable 405, which contains encrypted versions of HCA passwords 420, can be bundled with the HCA firmware 404 distribution. This HCA password 420 can be a site specific password configured by the site administrator 412.

The upgrade control executable 405 can be used in host administrator 411 controlled, potentially automated, upgrade procedures. This approach avoids the need for the site administrator 412 to have root access to the host 402. Furthermore, the upgrade control executable 405 can be used to together with other mechanisms to avoid the risk of spyware on the host 402, since the host OS 406 and networking stack 407 are controlled by the host administrator 411 and not by the site administrator 412.

Additionally, the SMA 403 and PCIe 410, as shown in FIG. 4, have the same structure and perform the same function as the SMA 203 and PCIe 210, as shown in FIG. 2.

Figure 5:
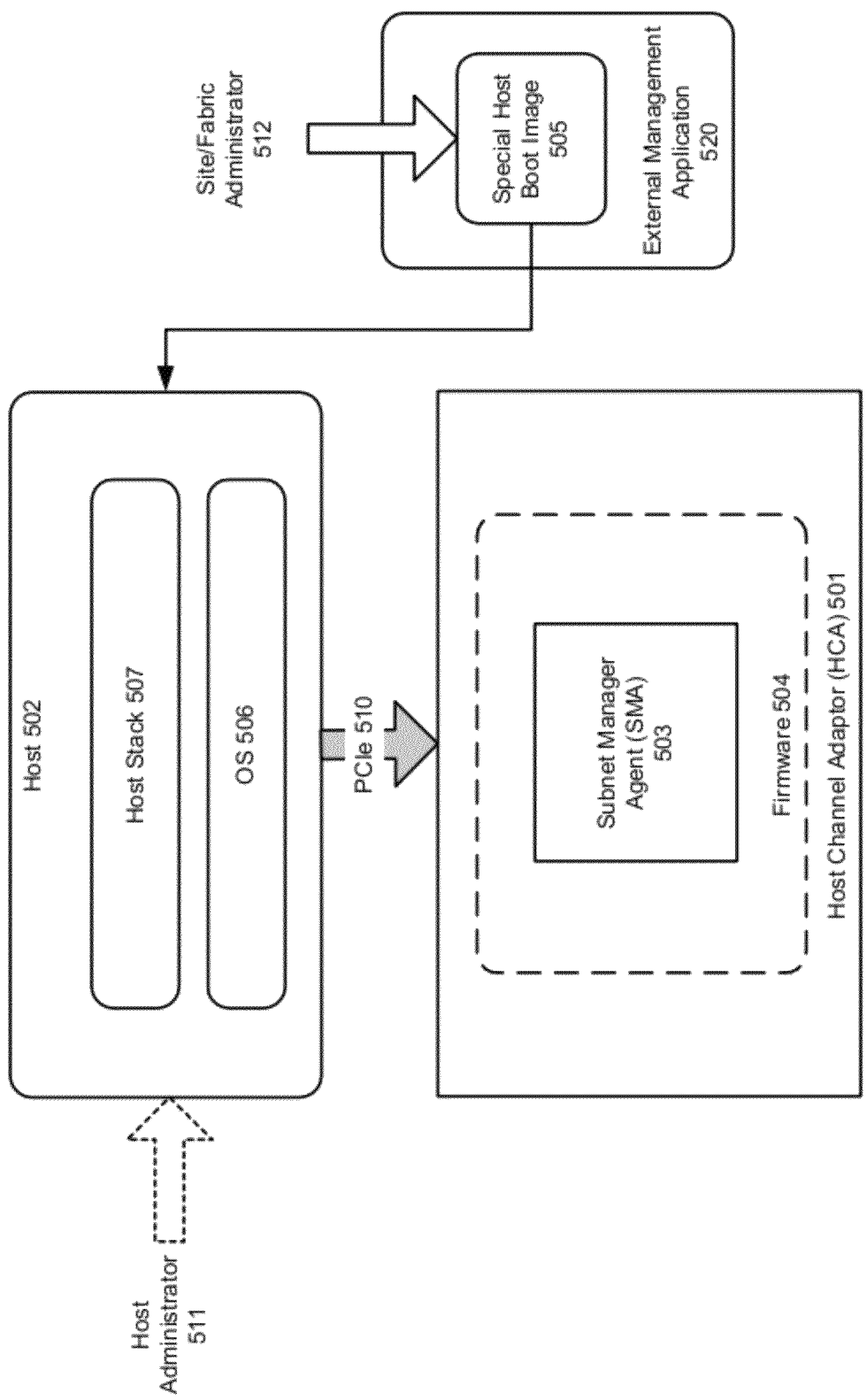
FIG. 5 shows an illustration of supporting secure firmware upgrade in an automated management solution in accordance with an embodiment of the invention.

FIG. 5 shows an illustration of supporting secure firmware upgrade in an automated management solution in accordance with an embodiment of the invention. As shown in FIG. 5, an external management application 520, e.g. the Enterprise Management Operations Center (EM-OC) provided by Oracle, can be used to upgrade an embedded firmware 504 for an HCA 501 that is connected to a host 502, as part of an automated management solution, without depending on the host OS 506 and networking stack 507.

A special host boot image 505 defined by the external management application 520 can be installed on the host 502, and can be used in the automated management solution for upgrading device firmware 504 on servers. The special host boot image 505 can execute on the host 502 under the complete control of the site/fabric administrator 512, i.e. the host administrator 511 may not be allowed to have access to the host 502 after the special host boot image 505 is installed.

Using this approach, the site administrator 511 can invoke the external management application 520 based automated upgrade procedures and can give the external management application 520 permission, over the network, to install the special host boot image 505 on host 502 and then install firmware 504 on the HCA 501. This special host boot image 505 can be provided with site specific configuration (e.g. by a site administrator 512) that includes specific parameters for identifying the various images that the upgrade operation may include.

The special host boot image 505 can include its own access control and authentication mechanisms that can prevent tampering from the host administrator 511 and/or other non-authorized humans or software. In the process of the secure HCA firmware upgrade, the special host boot image 505 can be used in a manner similar to the upgrade control executable 305 as described above and shown in FIG. 3. The special host boot image 505 can further contain both a list of passwords, which includes old passwords that have been used previously in this site and a new password that can be installed along with the specified upgrade. Thus, the automated upgrade can use the list of passwords to upgrade multiple hosts that represent different HCA password generation.

Additionally, the SMA 503 and PCIe 510, as shown in FIG. 5, have the same structure and perform the same function as the SMA 203 and PCIe 210, as shown in FIG. 2.

Figure 6:
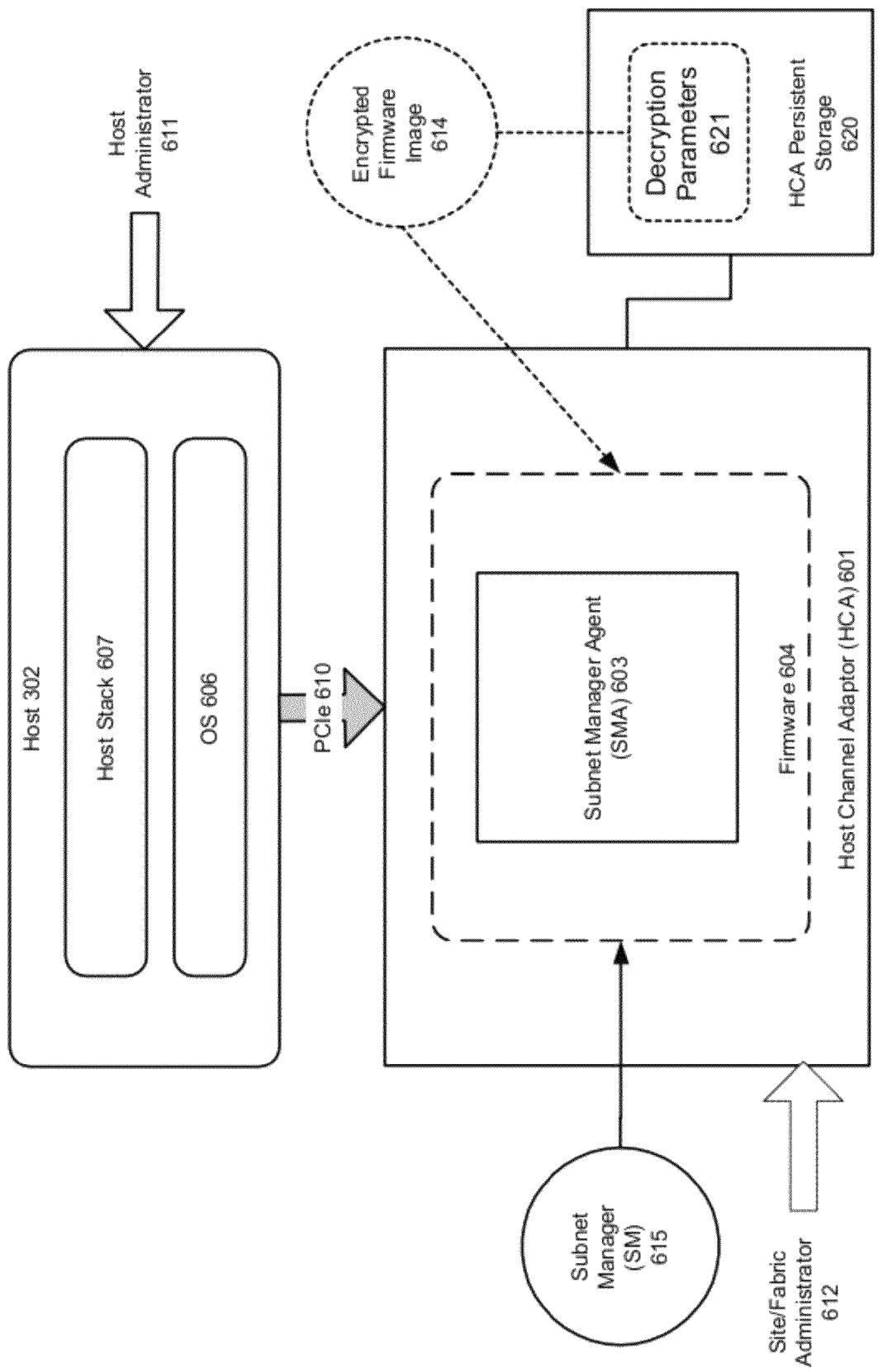
FIG. 6 shows an illustration of supporting a encrypted firmware image based HCA firmware upgrade in accordance with an embodiment of the invention.

FIG. 6 shows an illustration of supporting a encrypted firmware image based HCA firmware upgrade in accordance with an embodiment of the invention. As shown in FIG. 6, a site administrator 612, or a fabric administrator, can use an encrypted firmware image 614 to upgrade an embedded firmware 604 on a HCA 601 that is connected to a host 602. A built-in decryption mechanism can be provided for the HCA 601 to ensure that the installed firmware image 604 is valid. The built-in decryption mechanism can be associated with embedded decryption parameter 621 that are securely stored and maintained, e.g. in an HCA persistent storage 320 at the factory, or updated via special secure procedures by the site administrator 612 prior to enabling the HCA 601 to be used in production in the data center.

Additionally, if the initial firmware image 304 supports in-band authentication, then the actual upgrade procedure may be protected as long as the built-in authentication mechanism is not compromised and no new firmware 614 can be installed without resetting the link on all local HCA ports. By resetting the link on all local HCA ports, an external SM 615 can be guaranteed to observe a reset link state on the corresponding switch port and then to perform rediscovery and re-authentication.

This scheme can also include that no upgradable firmware or any software-based procedure can change the persistent hardware GUID of the HCA 601 that any legal and authenticated firmware image may report.

The site administrator can make sure that the GUID of a HCA 601 is correctly recorded and that the initial firmware image 604 is secure prior to allowing the HCA 601 to be used in any host 602 that can be controlled by any administrator 611 or software with host level root access but without fabric/site administrator privileges.

Thus, the HCA firmware 604 can be upgraded in-band from the fabric instead of relying on the host based PCIe 610 based upgrade, with the support of a secure fabric, a proper initial secure state for the HCA firmware 604, and in-band authentication mechanisms.

In accordance with an embodiment of the invention, the identity and trustfulness of the HCA 601 hardware and firmware 604 can be authenticated in-band by a SM 615 using discovery or public/private key based schemes. Furthermore, the integrity of a new firmware image is ensured when the image is encrypted using the public/private based key scheme, and/or via an encryption password scheme. The encryption password scheme can use an encryption password that is either pre-defined for the HCA 601, or supplied via the public/private based key scheme.

Figure 7:
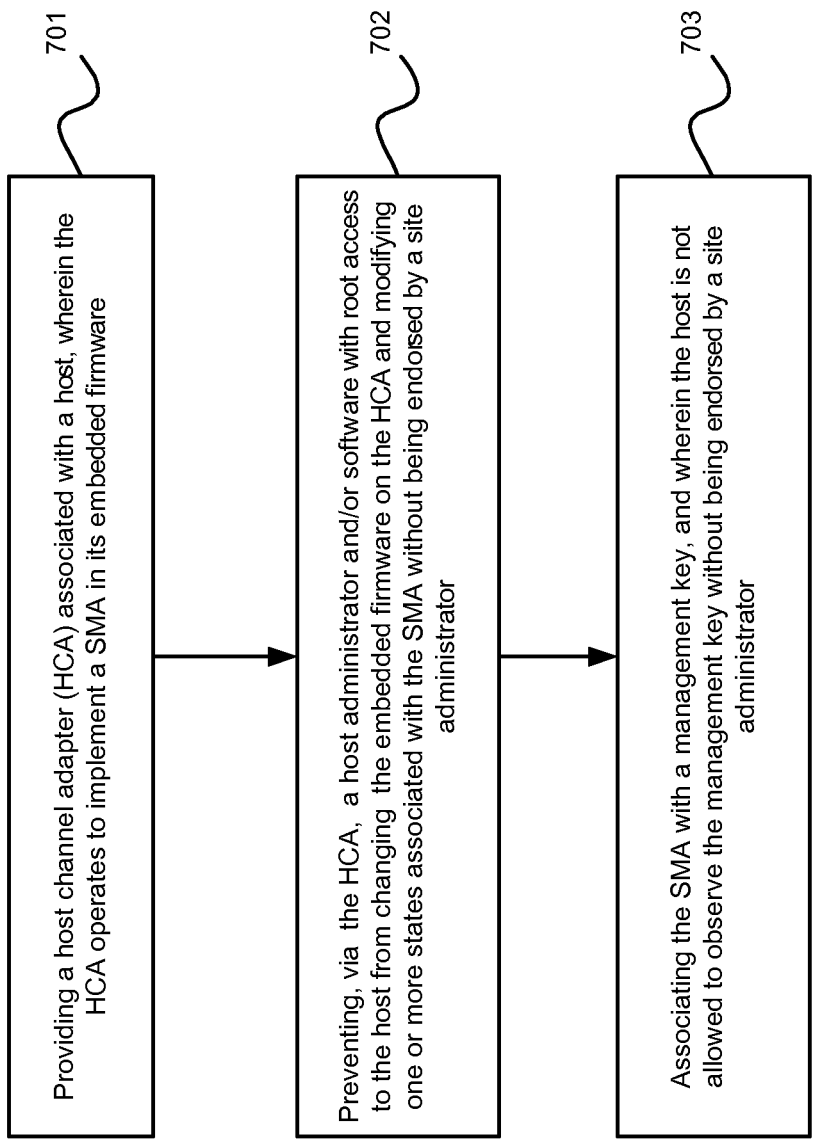
FIG. 7 illustrates an exemplary flow chart for providing a secure subnet management agent (SMA) in an IB network in accordance with an embodiment of the invention.

FIG. 7 illustrates an exemplary flow chart for providing a secure subnet management agent (SMA) in an IB network in accordance with an embodiment of the invention. As shown in FIG. 7, at step 701, an HCA can be associated with a host, wherein the HCA operates to implement a SMA in its embedded firmware. Then, at step 702, the HCA can prevent a host administrator and/or software with root access to the host from changing the embedded firmware on the HCA and modifying one or more states associated with the SMA without being endorsed by a site administrator. Additionally, at step 703, the SMA can be associated with a management key and the host is not allowed to observe the management key without being endorsed by a site administrator.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contem-

What is claimed is:

1. A system for providing a secure subnet management agent (SMA) in an InfiniBand (IB) fabric having a fabric administrator, the system comprising:
a host channel adapter (HCA) installed in a host system, the HCA comprising an embedded firmware;
a secure subnet management agent (SMA) implemented in the embedded firmware of the HCA;
wherein the SMA is associated with a management key, and wherein a host administrator and software with root access to the host system are prevented from observing the management key unless endorsed by the fabric administrator;
wherein the HCA comprises a protection scheme which utilizes a HCA password to prevent the host administrator of the host system and software with root access to the host system from changing the embedded firmware of the HCA and modifying one or more states associated with the SMA without presenting the HCA password;
an upgrade control executable which comprises an encrypted version of the HCA password bundled with a HCA firmware update;
wherein the upgrade control executable is configured to enable the host administrator of the host to upgrade the embedded firmware of the HCA using the HCA firmware update and the encrypted version of the HCA password; and
wherein the system further comprises a password mechanism, which enables the fabric administrator to upgrade the embedded firmware of the HCA without having root access to the host system.

2. The system according to claim 1, wherein:
the host system can access the HCA via a peripheral component interconnect express (PCIe) connection.

3. The system according to claim 1, further comprising:
an upgrade system which permits an authorized upgrade of the embedded firmware of the HCA in-band via the IB fabric.

4. The system according to claim 1, wherein:
identity and trustfulness of the HCA and embedded firmware can be authenticated in-band by a subnet manager using discovery or public/private key based schemes; and
integrity of a new firmware image comprising the HCA firmware update is ensured by encrypting the image using the public/private based key scheme, and/or via an encryption password scheme where the encryption password is either pre-defined for the HCA, or supplied via the public/private based key scheme.

5. The system according to claim 1, wherein:
the encrypted version of the HCA password is configured with a site specific password by the fabric administrator; and
wherein the upgrade control executable is configured to enable an automated upgrade procedure controlled by the host administrator.

6. The system according to claim 1, further comprising:
a HCA persistent storage associated with the HCA wherein the HCA stores and maintains the HCA password in a HCA persistent storage associated with the HCA.

7. The system according to claim 6, wherein:
the HCA implements a checksum verifying mechanism to verify the HCA firmware update included in the upgrade control executable.

8. The system according to claim 1, wherein the HCA is configured to verify a checksum of the HCA firmware update included in the upgrade control executable.

9. A method for providing secure subnet management agent (SMA) in an InfiniBand (IB) network having a fabric administrator, the method comprising:
implementing an SMA in an embedded firmware of a host channel adapter (HCA) associated with a host;
associating the SMA with a management key;
preventing a host administrator and software with root access to the host from observing the management key without authorization from the fabric administrator;
preventing, via a protection scheme of the HCA which utilizes a HCA password, the host administrator of the host and software with root access to the host from changing the embedded firmware on the HCA and modifying one or more states associated with the SMA;
providing an upgrade control executable which comprises an encrypted version of the HCA password bundled with a HCA firmware update;
using the upgrade control executable to upgrade the embedded firmware of the HCA using the HCA firmware update and the encrypted version of the HCA password;
providing a password mechanism which enables the fabric administrator to upgrade the embedded firmware on the HCA.

10. The method according to claim 9, further comprising:
communicating between the host and the HCA via a peripheral component interconnect express (PCIe) connection.

11. The method according to claim 9, further comprising:
configuring the upgrade control executable with the encrypted version of the HCA password, wherein the encrypted version of the HCA password is configured with a site specific password by the fabric administrator.

12. The method according to claim 9, further comprising:
authenticating identity and trustfulness of the HCA and embedded firmware in-band using discovery or public/private key based schemes; and
ensuring integrity of a new firmware image comprising the HCA firmware update by encrypting the image using the public/private based key scheme, and/or via an encryption password scheme where the encryption password is either pre-defined for the HCA, or supplied via the public/private based key scheme.

13. A non-transitory machine readable storage medium having instructions stored thereon for providing secure subnet management agent (SMA) in an Infiniband (IB) network, which instructions, when executed cause a system to perform steps comprising:
implementing a SMA in an embedded firmware of a host channel adapter (HCA) associated with a host;
associating the SMA with a management key;
preventing a host administrator and software with root access to the host from observing the management key without authorization from the fabric administrator;
preventing, via a protection scheme of the HCA which utilizes a HCA password, the host administrator and software with root access to the host from changing the embedded firmware on the HCA and modifying one or more states associated with the SMA without being endorsed by a site administrator;
providing an upgrade control executable which comprises an encrypted version of the HCA password bundled with a HCA firmware update;

using the upgrade control executable to upgrade the embedded firmware of the HCA using the HCA firmware update and the encrypted version of the HCA password; and providing a password mechanism which enables the fabric administrator to upgrade the embedded firmware on the HCA.

* * * * *

UNITED STATES PATENT AND TRADEMARK OFFICE
CERTIFICATE OF CORRECTION

PATENT NO. : 9,270,650 B2
APPLICATION NO. : 13/487973
DATED : February 23, 2016
INVENTOR(S) : Johnsen et al.

It is certified that error appears in the above-identified patent and that said Letters Patent is hereby corrected as shown below:

On the Title Page

On page 1, Column 1, item (75) under Inventors, Line 1, delete "Bjorn-Dag Johnsen" and insert -- Bjorn Dag Johnsen --, therefor.

On page 2, item (56) under OTHER PUBLICATIONS, Column 2, Line 15, delete "Aplication" and insert -- Application --, therefor.

In the Specification

Column 1, Line 51, delete "Forschungszcntrum" and insert -- Forschungszentrum --, therefor.

In the Claims

Column 10, Claim 9, Lines 24-25, after "password;" insert -- and --.

Signed and Sealed this
Eleventh Day of April, 2017

Michelle K. Lee
*Director of the United States Patent and Trademark Office*